United States Patent

Kreye

[11] Patent Number: 6,086,695
[45] Date of Patent: Jul. 11, 2000

[54] MOUNTING ARRANGEMENT ON THE EDGE OF A WINDOW PANE, IN PARTICULAR A MOTOR VEHICLE WINDOW PANE

[75] Inventor: Bernhard Kreye, Wunstorf, Germany

[73] Assignee: Henniges Elastomer- und Kunststofftechnik GmbH & Co. KG, Rehburg-Loccum, Germany

[21] Appl. No.: 09/094,351

[22] Filed: Jun. 9, 1998

[30] Foreign Application Priority Data

Jun. 18, 1997 [DE] Germany .............. 197 25 777

[51] Int. Cl.[7] .............. B60J 10/02; B60R 13/06
[52] U.S. Cl. .............. 156/108; 156/71; 52/208; 296/93; 296/84.1; 296/146.15
[58] Field of Search .............. 156/108, 71; 296/146.15, 296/84.1, 93; 52/208

[56] References Cited

U.S. PATENT DOCUMENTS

| | | |
|---|---|---|
| 4,072,340 | 2/1978 | Morgan . |
| 4,584,155 | 4/1986 | Zanella . |
| 4,737,335 | 4/1988 | Allebone . |
| 5,049,346 | 9/1991 | Yada et al. . |
| 5,085,021 | 2/1992 | Kunert ................. 52/208 |
| 5,088,787 | 2/1992 | Gross .................. 296/201 |
| 5,396,746 | 3/1995 | Whitmer . |
| 5,620,648 | 4/1997 | Volkmann et al. .......... 264/511 |

FOREIGN PATENT DOCUMENTS

| | | |
|---|---|---|
| 0476891A1 | 9/1991 | European Pat. Off. . |
| 963930 | 5/1957 | Germany . |
| 3140366A1 | 6/1983 | Germany . |
| 3637429A1 | 5/1987 | Germany . |
| 3627536A1 | 2/1988 | Germany . |
| 3627537A1 | 2/1988 | Germany . |
| 3728440A1 | 3/1989 | Germany . |
| 3639936C2 | 9/1990 | Germany . |
| 4034433A1 | 5/1991 | Germany . |
| 9011573 U | 10/1991 | Germany . |
| 4040009A1 | 6/1992 | Germany . |
| 4123256C1 | 10/1992 | Germany . |
| 69003520T2 | 9/1993 | Germany . |
| 3841233C2 | 1/1994 | Germany . |
| 3742881C2 | 1/1995 | Germany . |
| 4447192A1 | 7/1996 | Germany . |
| 19504828A1 | 8/1996 | Germany . |
| 19539960A1 | 4/1997 | Germany . |
| 19721566A1 | 12/1997 | Germany . |

OTHER PUBLICATIONS

JP Patent Abstract 2–18243 A., M–1031, Sep. 28, 1990 vol. 14, No. 454.
JP Patent Abstract 63–297009 A., M–807, Mar. 27, 1989, vol. 13, No. 122.

Primary Examiner—Sam Chuan Yao
Attorney, Agent, or Firm—Collard & Roe, P.C.

[57] ABSTRACT

A mounting arrangement for a moving vehicle window that is designed for a limited reduction in the window's sight. The mounting arrangement consists of a holding element attached to the edge of a car window pane via an adhesive. The holding element is formed when a curable compound is poured into two mold halves. Attached to the holding element is a functional element. In one embodiment of the invention, the functional element is a seal, designed to seal a gap between the window pane and a car door. In another embodiment of the invention, the functional element is designed as an electric pressure detector to shut the electric closure motor off when the functional element becomes compressed.

11 Claims, 2 Drawing Sheets

MOUNTING ARRANGEMENT ON THE EDGE OF A WINDOW PANE, IN PARTICULAR A MOTOR VEHICLE WINDOW PANE

BACKGROUND OF THE INVENTION

Field of the Invention

This invention relates to improvements in a mounting arrangement on the edge of a motor vehicle window pane. The parts of the mounting arrangement connect the window pane with the body of a motor vehicle.

SUMMARY OF THE INVENTION

The use of attachment parts on the outer or inner side of a motor vehicle window pane is known in the prior art. Therefore, an object of the invention is to provide a mounting arrangement that is an improvement over the prior art by reducing any obstruction to a window sight area. Another object of the invention is to provide a mounting arrangement that is inexpensive to manufacture and easy to install.

To achieve the objects of the invention, a method was found wherein an adhesive is applied to at least one surface of a window pane. In addition, a holding element is attached to an adhesive and formed by a means of a pourable, curing compound. Once the holding element is formed, it is attached to the window pane. In addition, a functional element is connected to the holding element opposite the adhesive.

The holding element consists of a two-component material such as polyurethane which can be employed as a pourable compound. The two components are mixed just before they are processed, and solidify by a chemical reaction. However, thermally formed single-component systems can also be used.

According to a further embodiment of the invention, the invention is formed by the following process: first, the pourable compound is filled in a mold comprising two mold halves. These mold halves are attached to the two edge sides of the window pane, opposing each other. The mold halves jointly form the casting mold on the surface of the pane. After the pourable compound has reached the solid state and the adhesive has cured, the two halves of the mold are removed.

The design of the functional element depends on the function intended for the mounting arrangement. In one embodiment of the invention the functional element is designed as a seal. When applied to a motor vehicle window pane that can be raised or lowered, this type of seal serves to seal the motor vehicle window pane after it has been raised to close the window.

In another embodiment of the invention, the functional element is designed as an electric pressure detector for switching on and off an electric drive, in particular a drive for operating a motor vehicle window pane.

In a third embodiment of the invention, the functional element can be glued and clipped to the holding element. Here, the functional element can be an electronic pressure detector having a tubular element with a downwardly directed electronic conductor being arranged on the inside of the tubular element at its apex. When the tubular element is pressed or squeezed together, the electric conductor contacts an electrically conductive base of the functional element. This in combination with the appropriate wiring, switches off the electric drive of the window pane.

In a fourth embodiment of the invention, the detector of the functional element is in the form of an electrically conductive sealing section that is preferably made of metal and can be disposed on the window instead of on the tubular element. This sealing section is connected with the base of the functional element via an elastic insulating adhesive. When the window is closed or when the sealing section hits an obstruction, it is pressed against the base of the functional element, which with the appropriate electric wiring, causes the electric drive of the window pane to be switched off.

BRIEF DESCRIPTION OF THE DRAWINGS

Other objects and features of the present invention will become apparent from the following detailed description considered in connection with the accompanying drawings which disclose several embodiments of the present invention. It is to be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
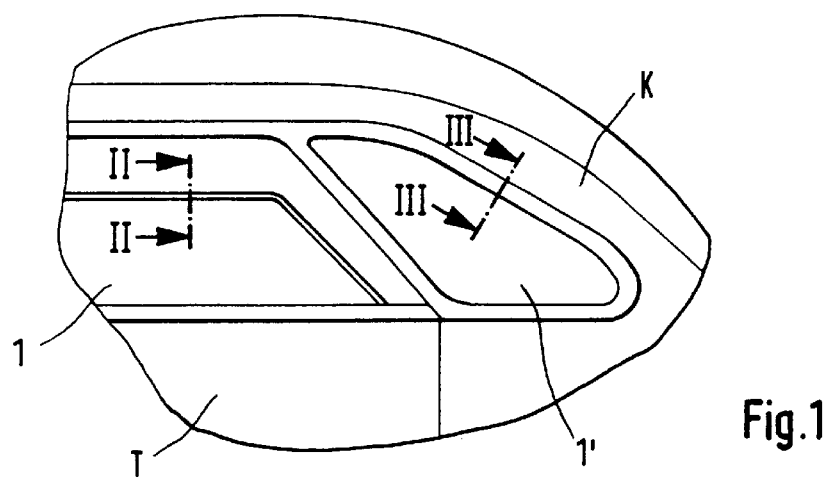
FIG. 1 is a side cross-sectional view of the rear window area of a passenger motor vehicle with a lowerable and raisable window pane, and a fixed triangular pane.

Referring to FIG. 1 there is shown the rear door T of a passenger motor vehicle K, having a movable window pane 1 on door T and lowered and raised electro-mechanically. In addition, a triangular pane 1' is fixed on car K to the rear of window 1.

Figure 2A:
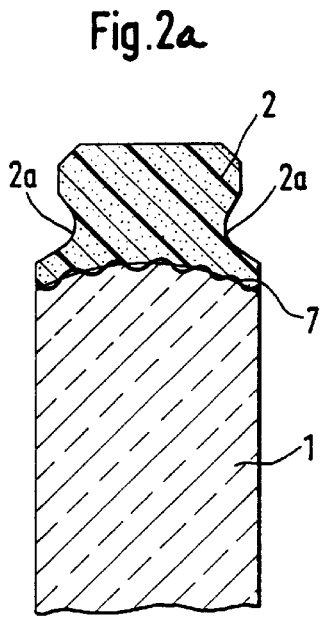
FIG. 2a shows an enlarged cross-sectional view taken along line II—II of FIG. 1.

FIG. 2a shows a cross-sectional view of window pane 1 taken along line II—II of FIG. 1. In FIG. 2(a) there is shown a holding element 2 on the surface of the edge of pane 1. In this case, holding element 2 is made of a pourable compound whereby adhesive 7 connects holding element 2 to pane 1. Holding element 2 has a flat top and has semicircular concave recesses 2a on the sides.

Figure 2B:
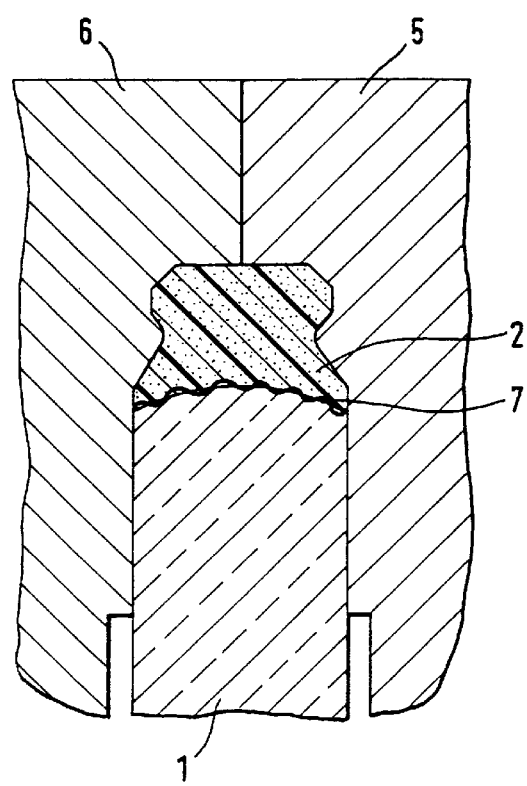
FIG. 2b shows a cross sectional view of the invention wherein the housing is molded.

FIG. 2b shows how this arrangement is produced. First, an adhesive 7 is applied to the surface of the top edge of pane 1. Mold halves 5 and 6 are subsequently placed on the edge of pane 1. In this way, mold halves rest against pane 1 on both sides of the edge and against each other outside of pane 1. In addition, these mold halves form the casting mold for holding element 2 above the face-side edge of pane 1. Next, a pourable compound is filled or injected into the casting mold by way of ducts (not shown), and holding part 2 is produced. Following a curing of the pourable compound, and settling of the adhesive, mold halves 5 and 6 are separated and removed.

Figure 3:
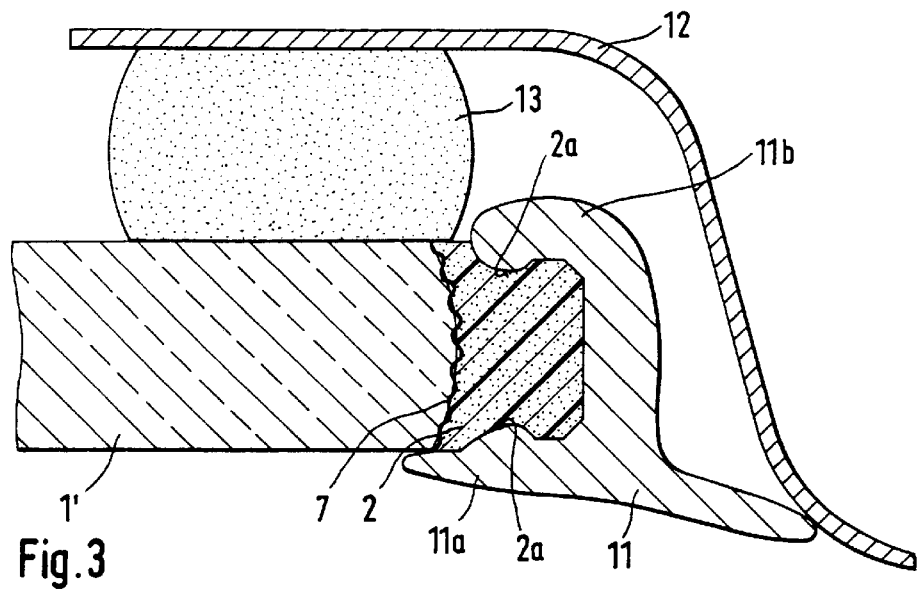
FIG. 3 shows an enlarged cross-sectional view taken along line III—III of FIG. 1.

FIG. 3 shows an example of the mounting arrangement with triangular pane 1. Pane 1 is glued to body flange 12 with an installation adhesive 13. A sealing section 11 is plugged over holding element 2 whereby U-shaped flanges 11*a* and 11*b* are clipped onto holding element 2. In this arrangement, U-shaped flanges 11*a* and 11*b* engage and lock into catch recesses 2*a* of holding element 2.

Figure 4:
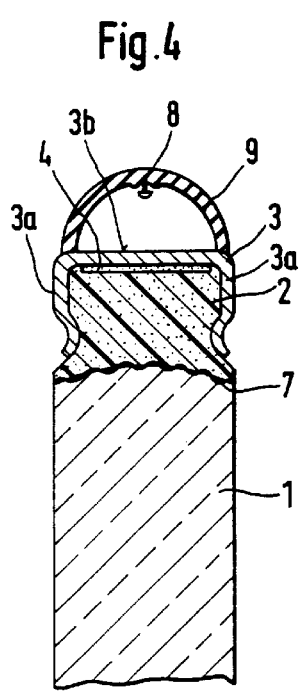
FIG. 4 shows a second embodiment of the invention, wherein there is a protective clamp-on (clip on) element attached to the holding element.
Figure 5:
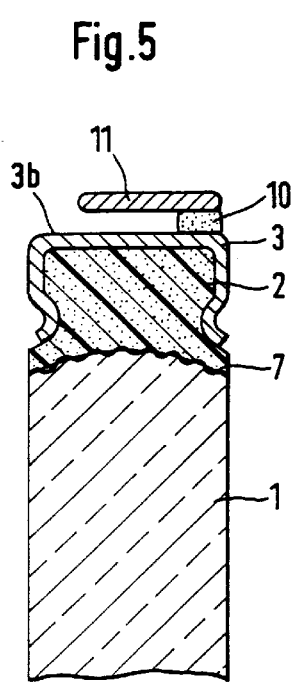
FIG. 5 shows a third embodiment of the mounting arrangement having a protective clip-on functional arrangement for the holding element.
Figure 6:
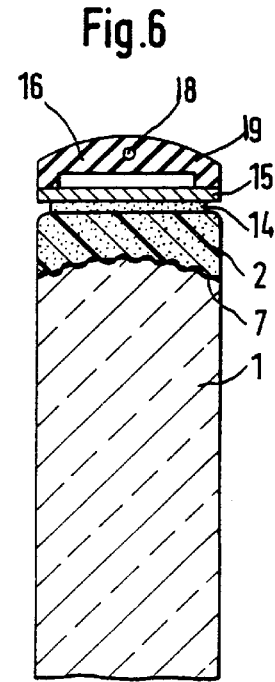
FIG. 6 shows a fourth embodiment of the mounting arrangement with a protective clip-on function arrangement having an electric conductor embedded into a tubular element.

FIGS. 4 to 6 show other embodiments of the invention with clamp-in protection function arrangements. In this embodiment, the base of the functional element consists of a U-section type metal strip 3 which embraces holding element 2 with its U-shaped legs 3*a* on both sides. In this case, the U-shaped legs positively lock with matching projections in to concave recesses 2*a* of holding element 2. In addition, metal strip 3 is glued to the flat surface of holding element 2 with an adhesive 4. A protruding elastic tubular element 9 is disposed on the free base surface 3*b* of metal strip 3. A blank electric conductor 8 extends on the inside of tubular element 9 in the area of the summit of the latter. When pane 1 is driven by the electric drive into the closing position, tubular element 9 is pressed against base surface 3*b* of metal strip 3 when the closed position is reached. In addition, tubular element 9 can also impact an obstruction which results in electric contact between electric conductor 8 and the electrically conductive base surface 3*b*. With appropriate electric wiring, the electric drive of pane 1 can be immediately switched off when this contact occurs.

FIG. 5 shows metal strip 3 mounted on holding part 2. A permanently elastic adhesive bead 10 is laterally placed on base surface 3*a* of metal strip 3. Flat metallic sealing section 11 is placed on top of adhesive bead 10 so that it is aligned parallel with base surface 3*b* of metal strip 3 at small spacing from the base surface. When pan 1 is closed, sealing section 11 is pressed against base surface 3*b* when the final position is reached, or earlier if a contact is made with an obstruction. When contact is made, the electric drive of the pane (not shown) is shut off.

FIG. 6 shows a metal foil 15 glued to a flat surface of holding element 2 by adhesive 14. Here a tubular element 19 is disposed on metal foil 15. In this embodiment, tubular element 19, is designed so that the electric conductor 18 is embedded in tubular element 19 in an apex zone 16 of tubular element 19. Within apex zone 16, tubular element 19 is made electrically conductive by embedding electrically conductive particles in the elastic material. In this case, tubular element 19 is pressed against metal foil 15 when the closed position of pane 1 is reached, or earlier if pane 1 impacts an obstruction. When tubular element 19 contacts foil 15, this results in electric contact, effecting a shutoff of the electric drive of pane 1.

Accordingly, while several embodiments of the present invention have been shown and described, it is to be understood that many changes and modifications may be made thereunto without departing from the spirit and scope of the invention as defined in the appended claims.

What is claimed is:

1. A method for producing a mounting arrangement on at least one exposed edge of a window pane comprising the steps of:

a) applying an adhesive to the at least one edge of the window pane;

b) forming a holding element by curing pourable compound and applying said holding element to said adhesive to attach said holding element only to the edge of the windowpane; and c) connecting a functional element to said holding element, wherein said functional element attaches to, and extends out of said holding element on the windowpane edge so as to reduce any visual obstruction to window sight area while connecting the windowpane to a car.

2. The method according to claim 1, wherein step b includes the steps of mounting a pair of mold halves to the two opposite surfaces of the pane, and pouring a casting compound into said mold halves to form a casting mold on a surface of the pane.

3. The mounting arrangement according to claim 1, wherein in step c, that of connecting said functional element to said holding element, said functional element is designed in the form of a seal.

4. The mounting arrangement according to claim 3, wherein the functional element is glued to the holding element.

5. The mounting arrangement according to claim 3, wherein in step c, that of connecting said functional element to said holding element, the functional element is clipped to the holding element.

6. The mounting arrangement according to claim 1, wherein in step c, that of connecting said functional element to said holding element, the functional element is formed with a pair of concave recesses disposed on each side of the element.

7. The mounting arrangement according to claim 1, wherein in step c, that of connecting said functional element to said holding element, the base of the functional element is U-shaped, having U-shaped legs wherein the U-shaped legs grip over the holding element on both sides and positively lock in the concave recesses of the holding element.

8. The mounting arrangement according to claim 1, wherein said functional element is designed in the form of an electric pressure detector for switching an electric drive used for closing the window pane.

9. The mounting arrangement according to claim 8 wherein said base surface of said functional element consists of electrically conductive material and said mounting arrangement further comprises:

an upwardly curved elastic tubular element arranged on the base, with a downwardly projecting electric conductor disposed on the inside of said tubular element approximately in the apex of said tubular element.

10. The mounting arrangement according to claim 8, wherein the base surface of the functional element consists of electrically conductive material, and an electrically conductive sealing section disposed above the base surface with a small spacing from the latter, said sealing section being joined with the base of the functional element via an elastic and insulating adhesive.

11. The mounting arrangement according to claim 8, wherein the functional element is glued to the holding element, and wherein the base of the functional element comprises an of electrically conductive material.

* * * * *